April 12, 1966
D. L. MAYNORD
3,246,069
ROTATIONAL METHOD OF MAKING A HOLLOW
MOLDED MULTILAYERED ARTICLE
Filed Feb. 26, 1962
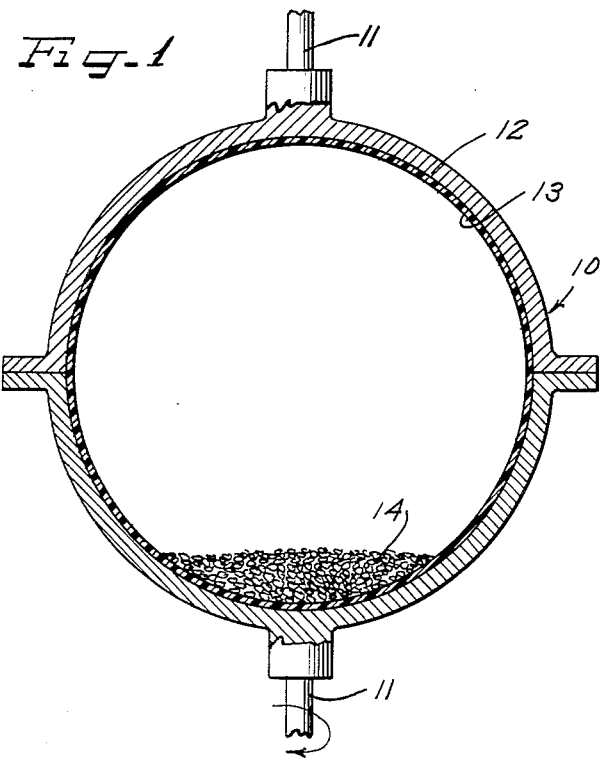
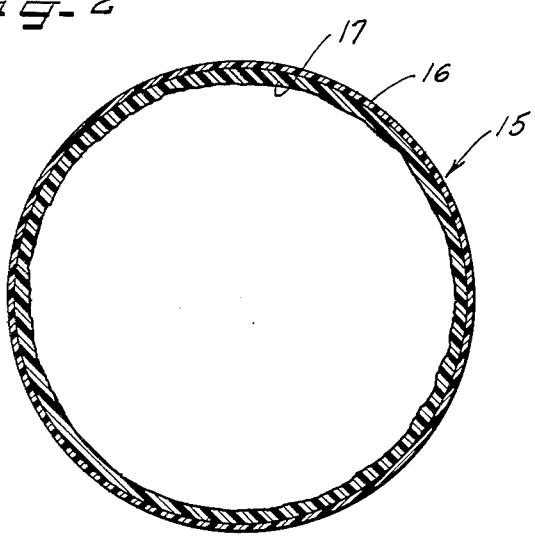
INVENTOR.
Demon L. Maynord
BY Hill, Sherman, Meroni, Gross & Simpson
ATTORNEYS United States Patent Office 3,246,069
Patented Apr. 12, 1966

3,246,069
ROTATIONAL METHOD OF MAKING A HOLLOW MOLDED MULTILAYERED ARTICLE
Demon L. Maynord, Collierville, Tenn., assignor to Wonder Products Company, Collierville, Tenn., a corporation of Tennessee
Filed Feb. 26, 1962, Ser. No. 175,806
3 Claims. (Cl. 264—255)

This invention relates to a method of making a molded article, and more particularly to the molding of hollow articles of thermoplastic polymers.

While the molding of hollow articles from ethenoid polymers, such as polyethylene or polypropylene is well known, such molded articles present surfaces that are not receptive of the usual paint or lacquers, and therefore are not generally suitable for the making of toys and the like that require a final paint or lacquer finish. In the manufacture of hobby horses, for instance, it would be very desirable to make the simulated horse body of polyethylene or of polypropylene, but it has been found difficult, if not impossible, to paint the surface satisfactorily. The surface of a molded polyethylene article is simply not receptive of the usual paints and lacquers that are employed in the painting of similar molded articles made from a cellulose acetate butyrate, from a vinyl resin, or from any of the other customary elastomeric materials.

The use of polyethylene in the molding of hollow articles also has the disadvantage that the article, at the completion of the molding operation, cannot be readily removed from the mold. Various releases, such as one of the silicones, have been tried, and while they may aid in the release of the molded article from the mold, they nevertheless leave the surface of the molded article non-receptive toward the usual paints and lacquers.

In seeking to remedy these drawbacks to the use of polyethylene and polypropylene in the manufacture of hollow molded articles, I have discovered that the molding of such articles can be very satisfactorily carried out if the molding surface is first coated with a plastisol. The term "plastisol" is here used in the usual sense as meaning a vinyl chloride polymer-plasticizer mass, without any volatile solvent and in the form of a paste or flowable mass. The use of a plastisol in this manner not only serves to impart to the surface of the molded article paint-retentive properties, but also serves as a release in the molding operation. All of the difficulties in removing the molded articles from the mold and in the painting of such molded articles are thereby eliminated.

It is therefore an important object of this invention to provide an improved method for the manufacture of molded articles, and particularly hollow articles, from polyethylene or polypropylene without any of the attendant difficulties in the removal of the article from the mold or in the painting of such article to produce the finished product.

Other and further important objects of this invention will become apparent to those skilled in the art from consideration of the following specification and the accompanying drawings, wherein:

FIG. 1 is a vertical sectional view, with parts broken away and in elevation, illustrating a rotational mold to exemplify the method of my invention; and FIG. 2 is a vertical sectional view of a molded article after removal from the mold of FIG. 1.

As shown on the drawings:

As illustrated in FIG. 1, the reference numeral 10 indicates a rotational mold, which may be in the form of a two-part spherical casing, mounted upon trunnions 11, 11 for rotation about the common axis of said trunnions and also for rotation about another axis inclined to the axis of said trunnions. Prior to the closing of the sectional mold 10, a plastisol is applied to the inner surface 12 of the mold sections to form a layer 13 thereon, as by spraying, brushing or slushing. After formation of the layer 13, a mass of discrete particles of polyethylene or polypropylene indicated at 14, is placed in the lower section of the mold, the mold closed and rotated. During the molding operation, the mold 10 is heated to a temperature and for a time sufficient, depending upon the size of the molded article, its weight and other variables, to complete the molding within a short time. After completion of the molding, the mold 10 is again opened up and a molded article, indicated by the reference numeral 15 (FIG. 2) removed therefrom. Said article 15 comprises an outer plastisol layer 16, corresponding to the plasticol layer 13, and an inner layer 17 of the polyethylene or polypropylene. The two layers 16 and 17 are integrally bonded to one another, as will be more fully explained hereinafter.

It will be understood that the foregoing is merely for illustrative purposes, to show the simple molding of a hollow sphere and the principles involved. Reference will be made hereinafter to the molding of hobby horse bodies and to use of more sophisticated equipment, but the foregoing indicates the method of my invention in its simplest form.

Plastisols that are suitable for the purposes of this invention can be made from polyvinyl resins, available in powdered form on the market under various proprietary names, by mixing them with one or more plasticizers, and with a stabilizer if desired. Goodrich Chemical Co. has a line of such polyvinyl chlorides known as "Geon" resins, while Goodyear Tire & Rubber Company prepares vinyl chloride interpolymers under the proprietary name "Pliovic." In general, such products can be used by themselves, or in admixture, and any of the customary plasticizers, stabilizers and the like employed in making the dry preparation into a plastisol.

A suitable method for the manufacture of articles from vinyl resins is disclosed in the Molitor Patent No. 2,629,134, to which reference may be made for the preparation of a plastisol suitable for use in the method of my present invention. As disclosed in the Molitor patent, the actual molding operation to be used in the manufacture of hollow plastic articles is what is termed rotational casting, wherein a hollow sectional mold is revolved in a plurality of planes and for a sufficient period of time to cause the plastisol within the mold to set as a gelled layer against the molding surface. Apparatus suitable for carrying out the manufacture of hollow molded plastics by the rotational casting method is disclosed in the Martin et al. Patent No. 2,629,131.

The following is given as a formula for a suitable plastisol, in which parts by weight are shown:

| | Parts |
|---|---|
| Geon 121 | 50 |
| Pliovic AO | 50 |
| Dioctylphthalate (DOP) | 55 |
| Rohm & Haas Admix No. 746 | 5 |
| Harshaw stabilizer 12–V–6 | 3 |

When this composition is mixed and stirred well, it forms a rather thick but flowable liquid. In the use of this plastisol to treat the hollow sectional mold, the plastisol is first applied to the inner surface of the mold, as by spraying, brushing or slushing. There is nothing critical about the thickness of the layer of the plastisol that should adhere to the molding surface of the mold, so long as the plastisol layer is continuous and co-extensive with the molding surface. In general, however, a layer of appreciable thickness, from about a mil to $\frac{1}{32}$ of an inch, and usually about $\frac{1}{64}$ of an inch, will be found satisfactory.

After the inner surface of the mold has been properly coated with the plastisol, the polyethylene or polypropylene, in solid particulate form, and in proper amount, is introduced into the mold. The amount of the thermoplastic resin to be used will depend, of course, upon the size of the article and the thickness of the body, or shell portion. In the making of a small hobby horse, for instance, about 2½ lbs. of polyethylene might be used in the charging of a mold.

The molding operation, as already indicated, is carried out in the manner and with the apparatus disclosed in the patents referred to. During the molding operation, the mold is heated to a temperature that is generally between 300 and 450° F., and more usually between 350 and 360° F. The time required for molding will, of course, depend upon the size of the article, its weight and other variables, but in the case of the small hobby horse the molding is complete within a matter of several minutes. At its completion, the operation is stopped, the mold allowed to cool and opened up to permit removal of the molded article. In the final finishing step, paint is applied in the case of a hobby horse body to simulate the appearance of a horse. Application of the paint is usually carried out by a spraying operation. Preferably, a plastisol type of paint that is air curing is used, such as the 3400 series of plastisol coatings put out by Globe-Hamilton Co. in both clear and colored forms.

Visual observation of the molded articles, prior to painting, reveals a texture of surface that is different from that of molded polyethylene articles, and similar to the surface texture of an article molded from polyvinyl chloride. When viewing a cross-section thereof, one cannot detect, at least by the eye alone, any boundary between the surface and the underlying body of the article. The surface does, however, have a different appearance and feel from the inner polyethylene surface, the latter being more glossy, and soapy or wax-like than the other surface. While not necessary to a complete understanding of my invention, I would assume that the polyvinyl chloride content of the plastisol used in the molding operation merely fuses and physically bonds to the polyethylene body, without any actual chemical reaction taking place between the different polymers. In any event, the surface containing the polyvinyl chloride is firmly bonded to and becomes integral with the underlying body of polyethylene, or polypropylene, as the case may be, and provides a surface that is highly receptive towards the subsequently applied paint.

Before each successive molding, the inside of the mold is coated with plastisol in a manner already described. At the end of the molding operation, the molded article can be easily removed without any of the difficulties often attendant upon the removal of a molded polyethylene article. Thus, the plastisol serves as a release and may be used solely for that purpose in the molding of any article made from polyethylene or polypropylene, whether the article is to be hollow, or not. When so used, only sufficient quantities of the plastisol need be employed to effect the desired easy removal of the molded article, whereas for some purposes, it may be desirable to have an appreciable thickness of the polyvinyl chloride surface layer and in such cases more of the plastisol in proportion to the amount of polyethylene or polypropylene used, will be employed.

I claim as my invention:

1. The method of making a hollow molded article, which comprises:

coating the molding surface of a hollow sectional mold with a continuous thin layer of a plastisol, charging into the mold a thermoplastic material selected from the group consisting of polyethylene and polypropylene, closing the mold, rotating said mold in a multiplicity of planes, heating said mold to fuse said thermoplastic material and bond said material and said plastisol together, cooling said mold, and removing the article therefrom.

2. The method of making a hollow molded article, which comprises:

coating the entire area of a relatively cool molding surface of a hollow sectional mold with a continuous thin layer of a plastisol, charging into said mold a discrete particulate mass of thermoplastic material selected from the group consisting of polyethylene and polypropylene, closing the mold, rotating said mold in a multiplicity of planes, heating said mold to a molding temperature of between about 300 and 450° F. to bond said thermoplastic material and said plastisol together, cooling said mold, and removing from said molding surface the resulting molded article having an adherently bonded continuous external surface thereon constituted solely by said plastisol.

3. The method of making a hollow molded article, which comprises:

coating the entire molding surface of a hollow sectional mold with a continuous thin layer of from about 1 mil to 1/32 of an inch of a thick but flowable plastisol, charging into the mold a particulate mass of polyethylene, closing the mold, rotating said mold in a multiplicity of planes, heating said mold to a molding temperature of from about 350 to 360° F. to fuse said plastisol against said molding surface and fuse said thermoplastic material against said fused plastisol so as to be integral therewith, cooling said mold, and removing from said molding surface the resulting molded article having an adherently bonded continuous external surface thereon constituted solely by said plastisol.

References Cited by the Examiner

UNITED STATES PATENTS

| | | | |
|---|---|---|---|
| 2,301,662 | 11/1942 | Wilson | 18—55 |
| 2,341,999 | 2/1944 | Lennington | 18—55 |
| 2,781,551 | 2/1957 | Richerod | 264—241 |
| 2,999,772 | 9/1961 | Burk et al. | 117—138.8 |
| 3,017,670 | 1/1962 | Zweig | 264—255 |
| 3,018,195 | 1/1962 | Kelly et al. | 117—138.8 |
| 3,108,850 | 10/1963 | Brandt | 264—97 |

FOREIGN PATENTS

| | | |
|---|---|---|
| 557,617 | 5/1958 | Canada. |
| 585,395 | 2/1947 | Great Britain. |
| 881,316 | 11/1961 | Great Britain. |

ROBERT F. WHITE, *Primary Examiner.*

RICHARD D. NEVIUS, ALEXANDER H. BRODMERKEL, *Examiners.*